United States Patent [19]
Tagoshi et al.

[11] Patent Number: 5,395,895
[45] Date of Patent: Mar. 7, 1995

[54] RESIN COMPOSITION AND A MOLDED ARTICLE UTILIZING IT

[75] Inventors: Hirotaka Tagoshi; Yasuhiro Mikawa; Masahiro Ueno; Shintaro Inazawa; Katsuaki Tsutsumi; Hiroyuki Hagi; Yukio Okamoto, all of Oita, Japan

[73] Assignee: Showa Denko K.K., Tokyo, Japan

[21] Appl. No.: 78,307

[22] PCT Filed: Nov. 2, 1992

[86] PCT No.: PCT/JP92/01416
§ 371 Date: Jun. 17, 1993
§ 102(e) Date: Jun. 17, 1993

[87] PCT Pub. No.: WO93/09179
PCT Pub. Date: May 13, 1993

[30] Foreign Application Priority Data

Nov. 5, 1991 [JP] Japan .................. 3-317424
Sep. 2, 1992 [JP] Japan .................. 4-234549
Sep. 2, 1992 [JP] Japan .................. 4-234609

[51] Int. Cl.$^6$ .................................. C08F 20/08
[52] U.S. Cl. .......................... 525/327.7; 525/384
[58] Field of Search ................. 525/327.7, 384

[56] References Cited

U.S. PATENT DOCUMENTS 3,299,184  1/1967  Whitworth et al. ............... 525/384
3,997,487  12/1976  Rees et al. ......................... 525/384

*Primary Examiner*—Joseph L. Schofer
*Assistant Examiner*—Jeffrey T. Smith
*Attorney, Agent, or Firm*—Antonelli, Terry, Stout & Kraus

[57] ABSTRACT

A thermally reversible crosslinked resin composition comprising a specific ethylenic copolymer, a specific polyhydric alcohol and a specific reaction promoter and a molded article produced by utilizing the resin composition are disclosed. Because the resin composition and the molded article have a high reaction rate of dissociation of the crosslinking during heating and a high reaction rate of formation of the crosslinking during cooling, they can be utilized for various applications, such as melt molding and the like, as the the thermally reversible crosslinked resin composition and the thermally reversible crosslinked molded article which are substantially valuable for commercial application.

11 Claims, No Drawings

RESIN COMPOSITION AND A MOLDED ARTICLE UTILIZING IT

TECHNICAL FIELD

The present invention relates to a crosslinking resin composition and a thermally reversible crosslinked molded article utilizing it.

BACKGROUND ART

Introduction of a crosslinked structure into a resin to enhance cohesive property of the resin and to improve physical properties such as heat resistance and mechanical strength is a generally adopted practice for the purpose of improvement of properties of the resin for commercial applications. However, the resin to which a crosslinked structure has been introduced forms gel easily to cause a problem for molding. Because of this reason, the crosslinking process is generally performed after the molding has been finished. The crosslinking process is performed, for example, by application of radiation or by utilizing a reaction with moisture in the air. These methods have problems that an article not yet crosslinked must be handled after the molding and that the cost of processing is rather high. Recycling of waste plastic article and waste parts formed in the punching process and in the molding process, is progressively required for the environmental protection and for the saving of materials. When a crosslinked structure is introduced in a resin, recycling of the crosslinked material is very difficult to cause a problem on the environmental protection and on the saving of materials.

Various methods have been proposed for solving these problems. In many of these methods, the crosslinking in a resin is dissociated during the molding process and the crosslinking is formed while the resin is cooled and solidified after the molding. In the methods proposed in U.S. Pat. Nos. 3,264,272, 3,267,083, 3,789,035 and 3,997,487, carboxylic acid groups are introduced into a resin and a pseudo-crosslinking is formed in the resin by forming a salt of a metal with the carboxylic acid group. In the methods proposed in U.S. Pat. Nos. 3,328,367 and 3,471,460, carboxylic acid groups are introduced into a resin and a pseudo-crosslinking is formed by forming a salt of an organic diamine with the carboxylic acid group. Other methods, such as the method utilizing Dieis-Alder reaction [J. P. Kennedy and K. F. Castner, Journal of Polymer Science, Polymer Chemistry Edition, Volume 17, Page 2055 (1979) and J. P. Kennedy and G. M. Carlson, ibid., Volume 21, Page 2973 (1983)] and the method utilizing the reaction of nitroso group (U.S. Pat. No. 3,872,057), were also proposed.

Still other methods, such as the method utilizing the reaction of an acid anhydride group with an alcohol or an amine [U.S. Pat. Nos. 3,299,184 and 3,678,016 and J. C. Decroix et al., Journal of Polymer Science, Polymer Symposium, Volume 52, Page 299 (1975)] and the method utilizing the ester exchange reaction of a resin containing hydroxyl group and a diester [D. S. Camplell, Chemistry and Industry (London), Volume 7, Page 279 (1974)], were also proposed.

However, the resins crosslinked with the pseudo-crosslinking have insufficient heat resistance because the crosslinking is easily dissociated with increase of temperature. The resin utilizing Dieis-Alder reaction has problems that the commercial production is difficult and that the crosslinking is not completely dissociated even at a high temperature to cause difficulty in molding. The resin utilizing the reaction of an acid anhydride and an alcohol or an amine or the reaction of ester exchange is not suitable for the commercial production because the crosslinking reaction during the cooling and solidifying of the resin is slow or the crosslinking reaction and the dissociation reaction cannot be controlled even though this method is the closest to the commercial production among the methods proposed.

DISCLOSURE OF THE INVENTION

Extensive investigations were undertaken with an object of solving the problems described above and providing a thermally reversible crosslinked resin composition exhibiting the properties that the crosslinked structure is not formed at the temperature of molding, that the crosslinked structure is rapidly formed during the cooling and solidification of the resin composition after the molding and that the crosslinked structure is completely dissociated by heating to the temperature of the molding again, which is, in other words, a thermally reversible crosslinked resin composition having very high reaction rates of the formation of crosslinking and the dissociation of crosslinking. To provide a molded article utilizing this resin composition is also the object of the invention.

It was discovered that the object described above can be achieved by compounding a reaction promoter into a composition comprising a specific ethylenic copolymer and a specific polyhydric alcohol having two or more hydroxyl groups in the molecule. The present invention has been completed on the basis of this discovery.

Thus, the present invention provides a resin composition comprising:

(a) an ethylenic copolymer containing ethylene and at least one radical polymerizable acid anhydride as the constituting monomers and having the concentration of the radical polymerizable acid anhydride group in the copolymer in the range from 0.1 to 20 weight %, (b) a polyhydric alcohol containing at least two hydroxyl groups in the molecule, and (c) a reaction promoter, the molar ratio of units of hydroxyl group in the polyhydric alcohol of the component (b) to units derived from the radical polymerizable acid anhydride group in the component (a) being in the range from 0.01 to 10 and the amount of the reaction promoter of the component (c) being in the range from 0.001 to 20 weight parts based on 100 weight parts of the ethylenic copolymer of the component (a).

The present invention also provides a thermally reversible crosslinked molded article characterized by that it is prepared by melt molding of the resin composition and by that a crosslinked structure is formed during the process of cooling.

The present invention also provides a resin composition having excellent heat stability at the temperature of molding and a molded article by utilizing as the polyhydric alcohol of the component (b) at least one kind of compound selected from the group consisting of (b)-(1) a specific polyoxyalkylene compound, (b)-(2) a specific polyglycerine ester compound and (b)-(3) sorbitan and a specific sorbitan derivative.

THE MOST PREFERRED EMBODIMENT TO CARRY OUT THE INVENTION

The components of the resin composition of the invention are described in the following.

Firstly, the ethylenic copolymer of the component (a) is a binary copolymer comprising ethylene and a radical polymerizable acid anhydride or a multi-component copolymer comprising ethylene, a radical polymerizable acid anhydride and other radical polymerizable comonomers. Examples of the radical polymerizable acid anhydride are maleic anhydride, itaconic anhydride, endic anhydride, citraconic anhydride, 1-butene-3,4-dicarboxylic acid anhydride, alkenylsuccinic anhydrides having at most 18 carbon atoms and a terminal double bond, alkadienylsuccinic anhydrides having at most 18 carbon atoms and a terminal double bond and the like compounds. The radical polymerizable acid anhydride may be utilized singly or as a combination of two or more kinds. The preferable examples among these compounds are maleic anhydride and itaconic anhydride.

It is necessary that the concentration of the radical polymerizable acid anhydride group in the ethylenic copolymer of the component (a) is in the range from 0.1 to 20 weight %. When the concentration of the unit derived from the radical polymerizable acid anhydride group is less than 0.1 weight %, the crosslinking density is not provided sufficiently even though the control of it is the object of the invention and the concentration of this range is not preferable. When the concentration is more than 20 weight %, the proper properties of polyethylenic resins which are expected to be exhibited by the ethylenic copolymer, such as the flexibility and the resistance to absorption of moisture, are affected adversely and the increase of cost makes commercial production difficult. Thus, the concentration of this range is not preferable either.

Ordinarily, the concentration of the radical polymerizable acid anhydride group in the ethylenic copolymer is preferably in the range from 1 to 10 weight %. However, the preferable range of the acid anhydride group sometimes varies depending on the kind of the polyhydric alcohol utilized as the component (b). For example, when (b)-(1), (b)-(2) or (b)-(3) which are described later is utilized as a component (b), the concentration of the radical polymerizable acid anhydride group in the ethylenic copolymer is preferably in the range from 0.1 to 10 weight % and more preferably in the range from 0.5 to 6 weight %.

Examples of the other comonomer which can be utilized together with the radical polymerizable acid anhydride described above (referred to as "the third monomer" hereinafter) are ethylenic unsaturated ester compounds, ethylenic unsaturated amide compounds, ethylenic unsaturated acid compounds, ethylenic unsaturated ether compounds, ethylenic unsaturated hydrocarbon compounds and the like other compounds. Examples of the ethylenic unsaturated ester compounds are vinyl acetate, methyl (meth) acrylate [(meth)acrylate means acrylate and methacrylate; this expression will be used hereinafter], ethyl (meth)acrylate, propyl (meth)acrylate, butyl (meth)acrylate, hexyl (meth)acrylate, octyl (meth)acrylate, lauryl (meth)acrylate, benzyl (meth)acrylate, methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate and the like.

Examples of the ethylenic unsaturated amide compound are (meth)acrylamide, N-methyl(meth)acrylamide, N-ethyl(meth)acrylamide, N-propyl(meth)acrylamide, N-butyl(meth)acrylamide, N-hexyl(meth)acrylamide, N-octyl(meth)acrylamide, N,N-dimethyl(meth)acrylamide, N,N-diethyl(meth)acrylamide and the like. Examples of the ethylenic unsaturated acid compound are (meth)acrylic acid, maleic acid, fumaric acid and the like. Examples of the ethylenic unsaturated ether compounds are methyl vinyl ether, ethyl vinyl ether, propyl vinyl ether, butyl vinyl ether, octadecyl vinyl ether, phenyl vinyl ether and the like. Examples of the ethylenic unsaturated hydrocarbon and the like other compound are styrene, $\alpha$-methylstyrene, norbornene, butadiene, acrylonitrile, methacrylonitrile, acrolein, crotonaldehyde, trimethoxyvinylsilane, triethoxyvinylsilane, vinyl chloride, vinylidene chloride and the like.

As the third monomer described above, two or more compounds may be utilized according to necessity. When the third monomer is utilized in the ethylenic copolymer, the concentration of the third monomer in the ethylenic copolymer of the component (a) is preferably 40 weight % or less. When the concentration is more than 40 weight %, the molding property is extremely deteriorated and it is difficult that the resin composition achieving the object of the invention is obtained.

The MFR (measured according to the method of Japanese Industrial Standard K7210, Table 1, Condition 4) of the ethylenic copolymer of the invention is preferably in the range from 0.1 to 1000 g/10 min. When the MFR is out of this range, it is difficult that the resin composition achieving the object of the invention is obtained.

The ethylenic copolymer is prepared by the bulk polymerization, the solution polymerization, the suspension polymerization or the emulsion polymerization. Generally, conventional apparatuses and technologies for production of a low density polyethylene can be utilized. The method most generally adopted among them is the bulk polymerization in which the radical polymerization is conducted under a pressure in the range from 700 to 3000 atmospheres at a temperature in the range from 100° to 300° C. It is preferred that the pressure is in the range from 1000 to 2500 atmospheres and the average temperature in the reactor is in the range from 150° to 270° C. When the pressure is less than 700 atmospheres, molecular weight of the polymer obtained is low and molding property and physical properties of the resin composition are inferior. Thus, the pressure of less than 700 atmospheres is not preferable. The pressure of more than 3000 atmospheres does not improve physical properties of the resin and is substantially meaningless. Furthermore, cost of the production is increased and the pressure of more than 300 atmospheres is not preferable. When the average temperature is lower than 100° C., the polymerization reaction is not stabilized and conversion to the copolymer is decreased to cause an economically unfavorable result. When the temperature is higher than 300° C., molecular weight of the copolymer obtained is decreased and, at the same time, danger of uncontrollable reactions is increased. Thus, the temperature of higher than 300° C. is not preferable.

As the apparatus of the production, a vessel type reactor is preferred. Particularly, because the radical polymerizable acid anhydrides are inferior in polymerization stability, the inside of the reaction vessel is required to be in a highly uniform condition. Plural of the reactor may be connected in series or in parallel to perform multistage polymerization according to necessity. Furthermore, the inside of the reactor may be divided into plural of zones to perform the reaction with more highly controlled temperature.

The polyhydric alcohol having two or more hydroxyl groups in the molecule of the component (b) in the resin composition of the invention is a compound of various kinds having two or more hydroxyl groups in the molecule and having the function as the so called crosslinking agent. Examples of the polyhydric alcohol are: alcohol compounds, such as ethylene glycol, glycerine, 1,4-butanediol, 1,6-hexanediol, 1,8-octanediol, 1,10-decanediol, trimethylolmethane, trimethylolpropane, pentaerythritol and the like; polyethylene glycols, such as diethylene glycol, triethylene glycol, tetraethylene glycol and the like; polyglycerines, such as diglycerine, triglycerine, tetraglycerine and the like; sugars, such as arabitol, sorbitol, xylose, arabinose, glucose, galactose, sorbose, fructose, palatinose, maltotriose, maleditose and the like; products of condensation with dehydration of these sugars; polyoxyalkylene compounds obtained by addition of ethylene oxide or propylene oxide to the compounds described above; compounds obtained by partial esterification of the compounds described above; compounds obtained by partial esterification of the polyoxyalkylene compounds described above with a carboxylic acid; polyoxyalkylene compounds obtained by addition of ethylene oxide or propylene oxide to the compounds obtained by partial esterification; saponified products of ethylene-vinyl acetate copolymers; polyvinyl alcohol; polymers having two or more hydroxyl groups in the molecule, such as polyolefinic oligomers or ethylene-hydroxyethyl (meth)acrylate copolymers and the like having two or more hydroxyl groups; and the like other compounds.

The melting point of the polyhydric alcohol is preferably 300° C. or lower. The polyhydric alcohol may be utilized as a combination of two or more kinds.

As the component (b), at least one compound selected from the group consisting of (b)-(1), (b)-(2) and (b)-(3) described in the following is particularly preferable. These compounds have not only the function as the so called crosslinking agent but also the property of providing the resin composition with the heat stability and the function of preventing formation of gel and granulation in the molded articles when the molding is performed at a relatively high temperature.

The compound (b)-(1) is a polyoxyalkylene compound having the structure obtained by adding ethylene oxide or propylene oxide to a polymethylol having the formula (I):

$$(R^1)_a C(CH_2OH)_b \tag{I}$$

wherein $R^1$ is a hydrogen atom or an acyclic alkyl group, a cyclic alkyl group or an aralkyl group respectively having 1 to 12 carbon atoms, a is an integer of 0 to 2, b is an integer of 2 to 4 and a and b satisfies the relation: a+b=4; or to a polyglycerine having the formula (II):

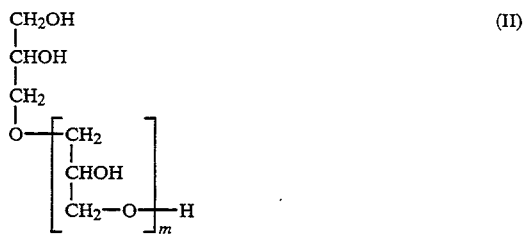

wherein m is an integer of 0 to 10.

The polyoxyalkylene compound described above can be easily obtained by the addition of ethylene oxide or propylene oxide to the polymethylol having the formula (I) or the polyglycerine having the formula (II) by the conventional methods. Examples of the polymethylol having the formula (I) are 1,3-dihydroxypropane, 2,2-dimethyl-1,3-dihydroxypropane, trimethylolethane, 1,1,1-trimethylolpropane, 1,1,1-trimethylolhexane, 1,1,1-trimethyloldecane, 2-cyclohexyl-2-methylol-1,3-dihydroxypropane, 2-(p-methylphenyl)-2-methylol-1,3-dihydroxypropane, pentaerythritol and the like. Examples of the polyglycerine having the formula (II) are glycerine, diglycerine, hexaglycerine, octaglycerine, decaglycerine and the like. It is generally very difficult to prepare the polyoxyalkylene compounds obtained by the addition of ethylene oxide or propylene oxide to these compounds as a single compound. Thus, the polyoxyalkylene compound is generally obtained as a mixture of more than one compounds having different structures but the mixture can be utilized without causing any problems to the object of the invention. The polyoxyalkylene compounds obtained by addition of ethylene oxide or propylene oxide to two or more kinds of the compound having the formula (I) and/or the compound having the formula (II) simultaneously can also be utilized.

The amount of the addition of ethylene oxide or propylene oxide to the compound having the formula (I) or the compound having the formula (II) is varied depending on the number of the hydroxyl group contained in these compounds and cannot be generally specified. It is preferred that two mol or more of ethylene oxide or propylene oxide are added to 1 mol of the compound. The upper limit of the amount of addition of ethylene oxide or propylene oxide to the compound is not particularly specified. However, when the amount of the addition is more than 50 mol to 1 mol of the compound having the formula (I) or the compound having the formula (II), the polyoxyalkylene compound obtained generally has a too large molecular weight to cause problems that mixing property during the preparation of the resin composition is inferior and that bleeding occurs in the molded articles. Thus, an excessively large amount of the addition is not preferred.

The compound (b)-(2) is a polyglycerine ester compound having the structure obtained by condensation with dehydration of an organic carboxylic acid having the formula (III):

$$R^2-COOH \tag{III}$$

wherein $R^2$ is an acyclic alkyl group, a cyclic alkyl group, an aralkyl group or an alkenyl group respectively having 2 to 25 carbon atoms and a polyglycerine having the formula (IV):

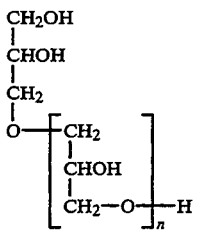

wherein n is an integer of 0 to 20 and having two or more hydroxyl groups in the molecule.

The compound (b)-(2) can be prepared easily by the condensation with dehydration of the organic carboxylic acid having the formula (III) or an equivalent thereof (an alkali metal salt, an acid halide and the like) and the polyglycerine having the formula (IV) by a conventional method. Examples of the organic carboxylic acid having the formula (III) are acetic acid, propionic acid, burytic acid, isobutyric acid, valetic acid, hexanoic acid, caprylic acid, captic acid, strearic acid, oleic acid, lauric acid, phenylacetic acid, phenylpropionic acid, phenylbutyric acid and the like. It is necessary that the polyglycerine ester compound (b)-(2) has two or more hydroxyl groups in the molecule. Therefore, the amount of the organic carboxylic acid utilized for the esterification of the polyglycerine having the formula (IV) needs to be decided by taking the number of the hydroxyl group contained in the polyglycerine into consideration.

Examples of the polyglycerine ester (b)-(2) are glycerine monostearate, glycerine monooleate, glycerine monolaurate, glycerine monocaprylate, glycerine monohexanoate, glycerine monophenetyl ester, glycerine monopropionate, diglycerine monostearate, diglycerine distearate, diglycerine monooleate, diglycerine monohexanoate, diglycerine dioctanoate, tetraglycerine monostearate, tetraglycerine tristearate, tetraglycerine tetrastearate, tetraglycerine trihexanoate, tetraglycerine monophenetyl ester, hexaglycerine monostearate, hexaglycerine distearate, hexaglycerine pentastearate, hexaglycerine trioleate, hexaglycerine monolaurate, hexaglycerine pentalaurate, decaglycerine monostearate, decaglycerine octastearate, decaglycerine pentaoleate, decaglycerine dilaurate, pentadecaglycerine distearate, pentadecaglycerine decaoleate, octadecaglycerine tetrastearate and the like compounds. The polyglycerine ester may be utilized singly or as a combination of two or more kinds.

The compound (b)-(3) is sorbitan and a sorbitan derivative having two or more hydroxyl groups in the molecule. The sorbitan described here means 1,5-sorbitan, 1,4-sorbitan, 3,6-sorbitan or a mixture of these compounds. The sorbitan derivative having two or more hydroxyl groups in a molecule comprises various kinds of compounds derived from the sorbitan described above and the preferable sorbitan derivatives are sorbitan ester compounds, polyoxyalkylenesorbitan compounds and polyoxyalkylenesorbitan ester compounds described in the following.

The sorbitan ester compound is a sorbitan ester compound having the structure obtained by condensation with dehydration of sorbitan and an organic carboxylic acid compound having the formula (V):

wherein $R^3$ is an acyclic alkyl group, a cyclic alkyl group, an aralkyl group or an alkenyl group respectively having 1 to 12 carbon atoms. The sorbitan ester compound described above can be easily prepared by the condensation with dehydration of sorbitan and the organic carboxylic acid compound having the formula (V) or an equivalent thereof (an alkali metal salt, an acid halide and the like) by a conventional method. Examples of the sorbitan ester compound are sorbitan monocaprylate, sorbitan monolaurate, sorbitan monomyristate, sorbitan monopalmitate, sorbitan monostearate, sorbitan monooleate, sorbitan dicaprylate, sorbitan dilaurate, sorbitan distearate and the like.

The polyoxyalkylenesorbitan compound is a polyoxyalkylenesorbitan compound having the structure obtained by addition of ethylene oxide or propylene oxide to sorbitan or to the sorbitan ester compound described above and having two or more hydroxyl groups in the molecule. This compound can be easily prepared by addition of ethylene oxide or propylene oxide to sorbitan or to the sorbitan ester compound described above by a conventional method. Example of the polyoxyalkylenesorbitan compound are a polyoxyethylenesorbitan (3.0 mol) adduct, a polyoxypropylenesorbitan (4.0 mol) adduct and the like.

The polyoxyalkylenesorbitan ester compound is a sorbitan ester compound having the structure obtained by condensation with dehydration of the organic carboxylic acid having the formula (V) and the polyoxyalkylenesorbitan compound described above and having two or more hydroxyl groups in the molecule. This compound can also be easily prepared by condensation with dehydration using the organic carboxylic acid having the formula (V) or an equivalent thereof by a conventional method. Examples of the polyoxyalkylenesorbitan ester compound are polyoxyethylenesorbitan monolaurate, polyoxyethylenesorbitan monomyristate, polyoxypropylenesorbitan monooleate, polyoxyethylenesorbitan dicaprylate, polyoxypropylenesorbitan distearate and the like.

In the reaction of the addition or condensation, it is generally very difficult to prepare the compound as a single compound. Thus, the compound is generally obtained as a mixture of more than one compounds having different structures but the mixture can be utilized without causing any problems to the object of the invention. Two or more kinds of the compound may be selected from the sorbitan ester compounds, polyoxyalkylenesorbitan compounds, polyoxyalkylenesorbitan ester compounds and other sorbitan derivatives and utilized together.

It is necessary that the amount of the polyhydric alcohol of the component (b) utilized is adjusted in such a manner that the molar ratio of the unit of the hydroxyl group contained in the polyhydric alcohol to the unit derived from the radical polymerizable acid anhydride contained in the ethylenic copolymer of the component (a) is in the range from 0.01 to 10. It is preferred that the molar ratio is in the range from 0.05 to 5. When the molar ratio is less than 0.01, the crosslinking cannot be introduced into the resin composition in a sufficient amount. When the molar ratio is more than 10, the increase of the polyhydric alcohol does not provide any additionally meaningful crosslinking while cost of the resin composition is increased. Thus, the amounts outside of the specified range are not advantageous.

When the amount of the unit derived from the radical polymerizable acid anhydride contained in the ethylenic copolymer is in the range from 0.1 to 1 weight %, the molar ratio of the unit of the hydroxyl group contained in the polyhydric alcohol is more preferably in the range from 0.1 to 5.

The reaction promoter of the component (c) contained in the resin composition of the invention is a compound which activates the carbonyl group contained in the unit derived from the radical polymerizable acid anhydride to promote the reaction of the hydroxyl group and the acid anhydride group. Various compounds can be utilized as the reaction promoter and metal salts of organic carboxylic acids are the examples. Examples of the metal salt of organic carboxylic acid are metal salts of fatty acids having 1 to 30 carbon atoms, such as salts of acetic acid, propionic acid, butyric acid, octanoic acid, decanoic acid, lauric acid, myristic acid, palmitic acid, stearic acid, oleic acid, behenic acid and the like with metals of the IA group, the IIA group, the IIB group and the IIIB group of the Periodic Table (like Li, Na, K, Mg, Ca, Zn, Al and the like). More specific examples of the metal salt of organic carboxylic acid are lithium acetate, sodium acetate, magnesium acetate, aluminum acetate, potassium butyrate, calcium butyrate, zinc butyrate, sodium octanoate, calcium octanoate, potassium decanoate, magnesium decanoate, zinc decanoate, lithium laurate, sodium laurate, calcium laurate, aluminum laurate, potassium myristate, sodium myristate, aluminum myristate, sodium palmitate, zinc palmitate, magnesium palmitate, sodium stearate, potassium stearate, calcium stearate, zinc stearate, sodium oleate, sodium behenate and the like. Among these compounds, lithium laurate, sodium laurate, potassium laurate, aluminum laurate, potassium myristate, sodium myristate, aluminum myristate, sodium palmitate, zinc palmitate, magnesium palmitate, sodium stearate, potassium stearate, calcium stearate, zinc stearate, sodium oleate and the like are preferable.

Other examples of the metal salt of organic carboxylic acid are polymers containing the structure of the metal salt of carboxylic acid in the molecule. Examples of the polymer having such structure in the molecule are: polymers having the structure obtained by copolymerization of ethylene and a metal salt of a radical polymerizable unsaturated carboxylic acid in which the metal is a metal of the group IA, the group IIA, the group IIB or the group IIIB of the Periodic Table (such as Li, Na, K, Mg, Ca, Zn, Al and the like); and polymers having the structure obtained by multi-component copolymerization of ethylene, a metal salt of a radical polymerizable carboxylic acid and other radical polymerizable unsaturated carboxylic acids and/or derivatives thereof.

Still other examples are: polymers having the structure obtained by graft polymerization of a metal salt of a radical polymerizable unsaturated carboxylic acid to an olefinic polymer, such as polyethylene, polypropylene, a free ethylene-propylene copolymer and the like (a free unsaturated carboxylic acid may be polymerized and then neutralized); and polymers having the structure obtained by simultaneous multiple graft polymerization of a metal salt of a radical polymerizable unsaturated carboxylic acid and other radical polymerizable unsaturated carboxylic acid and/or derivatives thereof to an olefinic polymer. Examples of the radical polymerizable unsaturated carboxylic acid and the derivative thereof utilized herein are (meth)acrylic acid, maleic acid, fumaric acid, monomethyl maleate, monomethyl fumarate, monoethyl maleate, monoethyl fumarate, monobutyl maleate, monobutyl fumarate, methyl (meth)acrylate, dimethyl maleate, dimethyl fumarate, diethyl maleate, diethyl fumarate, dibutyl maleate, dibutyl fumarate and the like.

Other examples of the promoter utilized in the resin composition of the invention are tertiary amine compounds. Examples of the tertiary amine compounds utilized herein are trimethylamine, triethylamine, triisopropylamine, trihexylamine, trioctylamine, trioctadecylamine, dimethylethylamine, methyldioctylamine, dimethyloctylamine, diethylcyclohexylamine, N,N-diethyl-4-methylcyclohexylamine, diethylcyclododecylamine, N,N-diethyl-1-adamantanamine, 1-methylpyrrolidine, 1-ethylpyrrolidine, 1-ethylpiperidine, quinuclidine, triphenylamine, N,N-dimethylaniline, N,N-diethylaniline, N,N-dimethyl-m-phenethiazine, 4-t-butyl-N,N-dimethylaniline and the like.

Still other examples of the promoter are quaternary ammonium salts. Examples of the quaternary ammonium salts utilized herein are tetramethylammonium tetrafluoroborate, tetramethylammonium hexafluorophosphate, tetramethylammonium bromide, tetraethylammonium bromide, tetraethylammonium iodide, methyltri-n-butylammonium chloride, tetrabutylammonium bromide, tetrahexylammonium bromide, tetraheptylammonium bromide, phenyltrimethylammonium bromide, benzyltriethylammonium chloride and the like.

Hydroxides of metals of the IIA group, the IIB group and the IIIB group and halides of metals of the IIA group and the IIB group can also be utilized as the reaction promoter. Examples of the hydroxide of a metal of the IIA group, the IIB group or the IIIB group are calcium hydroxide, magnesium hydroxide, aluminum hydroxide and the like. Examples of the halide of a metal of the IIA group or the IIB group are calcium chloride, calcium bromide, magnesium chloride and the like.

Salts of oxo-acids and metals of the IA group, the IIA group, the IIB group and the IIIB group can also be utilized as the reaction promoter. Examples of the salt of the oxo-acid and the metal described above are sodium nitrate, calcium nitrate, zinc nitrate, magnesium nitrate, aluminum nitrate, sodium phosphate, calcium phosphate, sodium carbonate, calcium carbonate, magnesium carbonate, sodium sulfate, zinc sulfate, magnesium sulfate, aluminum sulfate, sodium chlorate, potassium chlorate, sodium iodate and the like. Alkali metal salts of Lewis acids, such as $LiBF_4$, $NaBF_4$, $KBF_4$, $NaPF_6$, $KPF_6$, $NaPCl_6$, $KPCl_6$, $NaFeCl_4$, $NaSnCl_4$, $NaSbF_6$, $NaAsF_6$, $NaAsCl_6$, $KAsCl_6$ and the like can be utilized as the reaction promoter as well.

Among the compounds shown as examples of the reaction promoter, the metal salts of the polymers containing carboxyl groups and the metal salts of the organic carboxylic acids are preferably utilized. The reaction promoter may be utilized as a combination of two more kinds according to necessity.

It is necessary that the amount of the reaction promoter utilized is in the range from 0.001 to 20 weight parts based on 100 weight parts of the ethylenic copolymer of the component (a). The amount of the reaction promoter is preferably in the range from 0.01 to 15 weight parts on the same basis. When the amount is less than 0.001 weight parts, the reaction is too slow to efficiently introduce the crosslinked structure into the resin composition. When the amount is more than 20 weight parts, the amount is not only meaningless for enhancing the reaction rate but also economically unfavorable.

Various additives, compounding ingredients, fillers and the like can be contained in the resin composition of the invention within the range that the object of the invention is not adversely affected. Examples of such materials are antioxidants (heat stabilizers), ultraviolet absorbents (light stabilizers), antistatic agents, anticlouding agents, flame retardants, lubricants (slipping agents and antiblocking agents), inorganic fillers such as glass fillers and the like, organic fillers, reinforcing materials, coloring agents (dyestuffs and pigments), foaming agents, perfumes and the like.

For the production of the resin composition of the invention, the components (a), (b) and (c) and other additives utilized according to necessity are mixed by various methods. As the method of mixing, various conventional methods of mixing of resins can be adopted. For example, the resin components may be mixed by dry blending with a Henshel mixer, a tumbler and the like or by melt mixing with a kneader like a Banbury mixer, a static mixer, a pressurized kneader, an extruder, a roll mill and the like. A homogeneous mixture can be obtained when the resin components are first mixed by the dry blending and the mixture thus obtained is further mixed by the melt mixing. The resin components may be melt mixed during molding of the resin composition. In this method, the resin components in the form of pellets or powder are dry blended and then melt blended by making use of the production process of a film or the like in an extruder, an injection molding machine or the like.

Though the resin composition of the invention is molded by melt mixing, the crosslinked structure is not formed during the molding process. After the resin composition is formed into pellets, plates, films or various injection molded articles, the crosslinked structure is formed during the cooling process to provide the products with the enhanced heat resistance and mechanical strength by the increase of the cohesive strength. Even though the crosslinked structure is formed, the crosslinked structure is dissociated to recover the necessary property for molding. The crosslinked structure is formed again during the cooling process after the newly made molding process and the molded article having a high strength is produced.

As an example of the condition of the molding, when the temperature of the extruder and the die is adjusted in such as way that the temperature of the resin composition is kept 200° C. or higher (preferably at the melting point of the polyhydric alcohol or higher), the crosslinked structure in the resin composition is dissociated and the molding can be performed. When the resin composition is cooled for solidification of the resin composition, the crosslinking is quickly formed by the action of the reaction promoter and the molded article of the resin composition in which the crosslinked structure is introduced can be produced. Therefore, the resin composition after the molding has the enhanced strength and increased heat resistance and thus the molded articles useful for various applications can be obtained. The molded articles, such as films, sheets, blow molded articles, injection molded articles, laminates and the like, can be utilized as packaging materials, containers, mechanical parts, articles for daily use and the like. The resin composition can also be utilized as the resin modifier for improvement of environmental stress cracking resistance (ESCR), mechanical strength, heat resistance and the like.

The resin composition and the molded article of the invention comprises the component (a), the component (b) and the component (c) as the major components thereof. However, various kinds of other polyolefin resin can be comprised as well according to application and object. Examples of such polyolefin resin are homopolymers, such as polyethylene, polypropylene, polyisoprene, polybutene, poly-3-methylbutene-1, poly-4-methylpentene-1, polybutadiene, polystyrene and the like. Other examples of the polyolefin resin are: copolymers comprising the comonomers constituting the homopolymers described above, such as ethylene-propylene copolymers; linear low density polyethylenes comprising butene-1, 4-methylpentene-1, hexene-1, octene-1 and the like, as the comonomers; and copolymers, such as block copolymers of propylene and ethylene. Still other examples are mixtures, graft polymers and block copolymers of the resins described above; copolymers of ethylene and vinyl acetate; and the like other polymers.

The MFR [measured according to the method of Japanese Industrial Standard K7210, Table 1, Condition 4 (for polyethylene-type resins) or Condition 14 (for polypropylene-type resins)] of the polyolefin utilized in the invention is preferably in the range from 0.1 to 1000 g/10 min. When the MFR is less than 0.1 g/10 min, formation of a composition with the resin composition becomes difficult and, furthermore, the molding property is inferior. When the MFR is more than 1000 g/10 min, mixing of the resins with each other becomes difficult and a homogeneous composition is not formed.

The amount of the polyolefin resin compounded in the resin composition is preferably 200 weight parts or less based on 100 weight parts of the resin composition or the molded article containing the component (a), the component (b) and the component (c) as the major components thereof. When the amount of the polyolefin resin is more than 200 weight parts, the heat resistance and the mechanical strength which are the essential characteristics of the resin composition or the molded article of the invention are sometimes not exhibited.

When the resin composition or the molded article of the invention containing the polyolefin resin is produced, the polyolefin resin may be mixed simultaneously during the mixing of the components (a), (b) and (c) or may be added separately after the resin composition has been prepared from the components (a), (b) and (c). As the method of mixing, various conventional methods of mixing of resins can be adopted. For example, the resin components may be mixed by dry blending with a Henshel mixer, a tumbler and the like or by melt mixing with a kneader like a Banbury mixer, a static mixer, a pressurized kneader, an extruder, a roll mill and the like. A homogeneous mixture can be obtained when the resin components are first mixed by the dry blending and the mixture thus obtained is further mixed by the melt mixing. The resin components may be melt mixed during molding of the resin composition of the invention. In this method, the resin components in the form of pellets or powder are mixed (dry blended) and then melt blended by making use of the production process of a film or the like in a extruder, an injection molding machine or the like.

The crosslinked structure can be considered to be introduced into the resin composition by the reaction which forms a half-ester (monoester) by the reaction of the acid anhydride group contained in the ethylenic copolymer with the hydroxyl group contained in the polyhydric alcohol. The binary resin composition composed of the ethylenic copolymer containing the acid anhydride group and the polyhydric alcohol exhibits the property of thermally reversible crosslinked resin which dissociates at a high temperature and forms the crosslinked structure again in the cooled condition. However, in this binary resin composition, the rates of the formation and the dissociation of the crosslinking are extremely slow and the resin composition cannot exhibit sufficient property under the generally adopted condition of melt molding processing.

On the other hand, because the resin composition of the invention contains the reaction promoter in addition to the two components described above, the rates of the formation and the dissociation of the crosslinking are increased and the resin composition is substantially brought into the condition capable of commercial application. For example, the metal ion in the metal salt of the organic carboxylic acid utilized as the reaction promoter is considered to increase the reaction rate between the acid anhydride group contained in the ethylenic copolymer and the hydroxyl group contained in the polyhydric alcohol. The thermally reversible crosslinked resin composition and the thermally reversible crosslinked molded article which can exhibit satisfactory property under the generally adopted heat molding conditions are provided owing to the effect of the addition of the metal salt of the organic carboxylic acid. The other reaction promoters are also considered to exhibit the same effect.

Thus, the resin composition and the molded article of the invention can exhibit excellent molding property by dissociation of the ester linkage under the suitably selected temperature of molding which is varied depending on the kind of the ethylenic copolymer of the component (a). When they are cooled, the ester linkage is considered to be formed again rapidly to develop the crosslinking and the molded article thus obtained is considered to contain the crosslinked structure introduced into it to exhibit the enhanced mechanical strength. However, the mechanism described here is not the established one and the present invention is not limited by the consideration on the mechanism described in the above.

The resin composition and the molded article of the invention have already achieved the object of the invention from the point of view that they provide the thermally reversible crosslinked resin composition and the thermally reversible crosslinked molded article which are substantially suitable for commercial application. However, the resin composition and the molded article of the invention as described above are not always excellent in the heat stability. During the continuous melt molding process for a prolonged time, a part of the resin composition is occasionally thermally degraded to form gel or granulation. Because of this phenomenon, the necessary physical properties (the satisfactory processability during the molding, the good mechanical strengths and the like) are not always obtained depending on the conditions, such as the kinds of the components (a), (b) and (c), the ratios of compounding components, conditions of the processing and the like.

For the purpose of overcoming the problems described above, the resin composition and the molded article utilizing the specific compound (b)-(1), (b)-(2) or (b)-(3) described above as the component (b) are provided. The resin composition and the molded article which utilize as the component (b) at least one kind of the compound selected from the group consisting of the compound (b)-(1), the compound (b)-(2) and the compound (b)-(3) are very excellent in the heat stability at the molding temperature and the unfavorable phenomena, such as the formation of gel and granules, are not found during the continuous melt molding process of a prolonged time. As the result, the resin composition and the molded article particularly valuable for commercial applications among the resin compositions and the molded articles of the invention are provided.

The compounds (b)-(1), (b)-(2) and (b)-(3) are considered to provide the resin composition and the molded article of the invention with the heat stability because of the particular chemical structures of these compounds. The mechanisms of the favorable effects of these compounds are described in the following.

The main cause of the heat degradation of the resin composition and the molded article of the invention is considered that the half-ester formed by the reaction of the acid anhydride and the hydroxyl group undergoes condensation with dehydration with another hydroxyl group to form a diester, resulting in a structure in which dissociation of the crosslinking cannot take place. Thus, the semi-permanent crosslinked structure is considered to be formed in this case.

The polyoxyalkylene compound of (b)-(1) having the specific structure has the particular molecular structure that the molecule is relatively bulky and, furthermore, the hydroxyl groups are not located close with each other but in separate positions. Thus, it is considered that the diester structure is not easily formed because of this molecular structure and the heat stability of the resin composition and the molded articles are enhanced.

The polyglycerine ester compound of (b)-(2) having the specific structure has the particular molecular structure that the molecule is relatively bulky and, furthermore, at most one primary hydroxyl group is contained in the molecule. Thus, it is considered that the diester structure is not easily formed because of this molecular structure and the heat stability of the resin composition and the molded articles are enhanced.

The sorbitan and the sorbitan derivatives of (b)-(3) having the specific structure has the particular molecular structure that the molecule is relatively bulky. Thus, it is considered that the diester structure is not easily formed because of this molecular structure and the heat stability of the resin composition and the molded articles are enhanced.

However, these mechanism cannot be construed as being completely elucidated and the present invention is not particularly limited by the considerations described above.

The invention will be described more specifically by the following examples and comparative examples; however these examples are not to be construed to limit the scope of the invention.

The abbreviations used in Tables 2 to 9 are summarized in Table 1 (1) and (2).

TABLE 1

| abbreviation | compound |
| --- | --- |
| Abbreviations for the component (b) | |

TABLE 1-continued

| abbreviation | compound |
|---|---|
| TMP | trimethylol propane |
| 1,10-DEC | 1,10-decanediol |
| E-HEA | copolymer of ethylene-hydroxyethyl acrylate, [hydroxyethyl acrylate 8 wt. %, MFR (according to Japanese Industrial Standard K7210, Table 1, Condition 4) 30 g/10 min.] |
| PEN | pentaerythritol |
| (b)-(1) | |
| TM-30E | an adduct of ethylene oxide (3.0 mol) to trimethylolpropane |
| TM-30P | an adduct of propylene oxide (3.0 mol) to trimethylolpropane |
| PE-50E | an adduct of ethylene oxide (5.0 mol) to pentaerythritol |
| PE-45P | an adduct of propylene oxide (4.5 mol) to pentaerythritol |
| DG-80E | an adduct of ethylene oxide (8.0 mol) to decaglycerine |
| HG-40P | an adduct of propylene oxide (4.0 mol) to hexaglycerine |
| (b)-(2) | |
| GR-SM | stearic acid monoester of glycerine |
| DG-CM | caprylic acid monoester of decaglycerine |
| DG-LM | lauric acid monoester of decaglycerine |
| DG-ST | stearic acid triester of decaglycerine |
| HG-SM | stearic acid monoester of hexaglycerine |
| PG-CT | caprylic acid monoester of pentaglycerine |
| (b)-(3) | |
| SMS | sorbitan monostearate |
| SML | sorbitan monolaurate |
| SDC | sorbitan dicaprylate |
| SDM | sorbitan dimyristate |
| PES | an adduct of ethylene oxide (4.0 mol) to sorbitan |
| PPS | an adduct of propylene oxide (5.0 mol) to sorbitan |
| PESML | an adduct of ethylene oxide (2.0 mol) to sorbitan monolaurate |
| PPSMS | an adduct of propylene oxide (1.0 mol) to sorbitan monostearate |
| SOR | 1,5-sorbitan |
| Abbreviations for the component (c) | |
| metal salt (a) | sodium salt of an ethylene-methacrylic acid copolymer (18 wt. %), 10 mol % of methacrylic acid are neutralized, MFR (according to Japanese Industrial Standard K7210, Table 1, Condition 4) 3.0 g/10 min. |
| metal salt (b) | zinc salt of an ethylene-methacrylic acid copolymer (10 wt. %), 10 mol % of methacrylic acid are neutralized, MFR (according to Japanese Industrial Standard K7210, Table 1, Condition 4) 4.0 g/10 min. |
| metal salt (c) | zinc salt of an ethylene-methacrylic acid copolymer (18 wt. %), 10 mol % of methacrylic acid are neutralized, MFR (according to Japanese Industrial Standard K7210, Table 1, Condition 4) 4.0 g/10 min. |
| metal salt (d) | sodium salt of an ethylene-methacrylic acid copolymer (19 wt. %), 62 mol % of methacrylic acid are neutralized, MFR (according to Japanese Industrial Standard K7210, Table 1, Condition 4) 3.0 g/10 min. |
| metal salt (e) | sodium stearate |
| metal salt (f) | calcium stearate |

EXAMPLE 1

By using an apparatus for production of high pressure polyethylene having a vessel type reactor, a copolymer of ethylene and maleic anhydride containing 3.0 weight % of the unit derived from maleic anhydride and having MFR (measured according to the method of Japanese Industrial Standard K7210, Table 1, Condition 4) of 10 g/10 min was prepared. The composition of the copolymer was determined by the infrared absorption spectrum. The tensile strength at break measured according to the method of Japanese Industrial Standard K6760 was 134 kg/cm$^2$ and the elongation at break was 810%.

To 94 weight % of the copolymer prepared above, 0.1 weight % (hydroxyl group/acid anhydride group=0.79) of trimethylolpropane as the crosslinking agent and 5 weight % (metal atom/acid anhydride group =0.30) of a partially neutralized product of ethylene-methacrylic acid copolymer (containing 18 weight % of methacrylic acid, about 10 mol% of which were neutralized with sodium ion; abbreviated as the metal salt (a) hereinafter) having the MFR (measured according to the method of Japanese Industrial Standard K7210, Table 1, Condition 4) of 3.0 g/10 min and the density of 0.94 g/cm$^3$ as the metal salt of organic carboxylic acid were mixed. For the mixing of the components, the three components were dry blended with a tumbler and then pelletized by melt mixing with a biaxial extruder of 30 mm$\phi$ at 250° C. The mixture had MFR (measured according to the method of Japanese Industrial Standard K7210, Table 1, Condition 14) of 3.2 g/10 min.

Tensile strength of the resin composition prepared above was measured. The sample for the measurement was prepared by molding at the temperature of 250° C. and could be prepared without any problem. The sample was conditioned at 23° C. in the relative humidity of 50% for 24 hours and the tensile strength was measured. The tensile strength at break was 212 Kg/cm$^2$ and the elongation at break was 630%.

Gel fraction of the sample was measured by the extraction method. The sample was placed in a cage of stainless steel net of 400 mesh and extracted with toluene at the boiling point for 6 hours by using a Soxhlet extraction apparatus. The content of the residue of the extraction (gel content) was 71%.

The sample was molded into a film. By using a film molder equipped with a 25 mmφ extruder and T dice of 200 mm width, the resin composition was processed at the resin temperature of 255° C. and with the pulling velocity of 3 m/min to produce a film of 75 μm thickness.

The molding was performed without any problem. The film obtained had excellent appearance, transparency and flexibility. The gel content measured by the method described above was 65%.

The results obtained above show that the resin composition of the invention can be melt molded and contains the crosslinking component.

EXAMPLES 2 TO 7 AND COMPARATIVE EXAMPLES 1 TO 5

Resin compositions were prepared by using the ethylenic copolymers, the polyhydric alcohols and the reaction promoters shown in Table 2 and by the same method as in Example 1 the physical properties of the prepared resin compositions were measured. The results are shown in Table 3.

TABLE 3-continued

|  | gel fraction (%) | 20° C. | | 85° C. |
|---|---|---|---|---|
|  |  | tensile strength (kg/cm$^2$) | elongation (%) | tensile strength (kg/cm$^2$) |
| Comparative Example 3 | 0 | 125 | 710 | 0.6 |
| Comparative Example 4 | 0 | 125 | 580 | 0.9 |
| Comparative Example 5 | 21 | 103 | 500 | 0.5 |

Examples 8 to 21 shown in the following are the examples in which the compound (b)-(1) was used as the component (b).

EXAMPLE 8

By using an apparatus for production of high pressure polyethylene having a vessel type reactor, a copolymer of ethylene and maleic anhydride containing 2.5 weight % of the unit derived from maleic anhydride and having MFR (measured according to the method of Japanese Industrial Standard K7210, Table 1, Condition 4) of 10 g/10 min was prepared. The composition of the copolymer was determined by the infrared absorption spectrum. The tensile strength at break measured according to the method of Japanese Industrial Standard K6760 was 132 kg/cm$^2$ and the elongation at break was 840%.

To 100 weight parts of the copolymer prepared above, 0.90 weight parts (hydroxyl group/acid anhydride group=0.4) of a polyoxyalkylene compound [an adduct of ethylene oxide (3.0 mol) to trimethylolpropane] as the crosslinking agent and 1 weight part (metal atom/add anhydride group: 0.06) of a partially neutralized product of ethylene-methacrylic acid copolymer [the metal salt (a)] having the MFR (measured accord-

TABLE 2

|  | ethylenic copolymer (a) | | | | | polyhydric alcohol (b) | | | reaction promoter (c) | |
|---|---|---|---|---|---|---|---|---|---|---|
|  | acid anhydride | | the third monomer | | | | | ratio of hydroxyl group to acid anhydride group | | |
|  | compound | amount (wt.%) | compound | amount (wt.%) | MFR 190° C. | amount (wt.%) | compound | amount (wt. %) | compound | amount (wt. %) |
| Example 1 | maleic anhydride | 3.0 | — | — | 5 | 98 | TMP | 1 | 0.75 | metal salt (a) | 1 |
| Example 2 | itaconic anhydride | 3.0 | — | — | 10 | 94 | TMP | 0.25 | 0.20 | metal salt (a) | 5.75 |
| Example 3 | maleic anhydride | 2.0 | MA*$^1$ | 15 | 10 | 93 | TMP | 6 | 4.71 | metal salt (b) | 1 |
| Example 4 | maleic anhydride | 3.0 | MA | 16 | 100 | 97 | TMP | 1 | 0.76 | metal salt (e) | 2 |
| Example 5 | itaconic anhydride | 1.0 | — | — | 10 | 87 | 1,10-DEC | 3 | 1.29 | metal salt (d) | 10 |
| Example 6 | maleic anhydride | 5.0 | MMA*$^2$ | 14 | 50 | 98.9 | PEN | 1 | 1.24 | metal salt (f) | 0.1 |
| Example 7 | itaconic anhydride | 3.0 | — | — | 30 | 65 | E-HEA | 32 | 0.99 | metal salt (d) | 3 |
| Comparative Example 1 | maleic anhydride TMP | 3.0 1 | — 0.74 | — — | 10 — | 100 — | — | — | — | — | — |
| Comparative Example 2 | itaconic anhydride | 5.0 | — | — | 100 | 99 | TMP | 1 | 0.74 | — | — |
| Comparative Example 3 | maleic anhydride | 3.0 | BA*$^3$ | 20 | 30 | 95 | — | — | — | metal salt (a) | 5 |
| Comparative Example 4 | maleic anhydride | 0.1 | — | — | 1 | 85 | TMP | 10 | 13.9 | metal salt (a) | 5 |
| Comparative Example 5 | maleic anhydride | 3.0 | — | — | 10 | 44 | TMP | 1 | 1.65 | metal salt (e) | 55 |

*1 MA: methyl acrylate
*2 MMA: methyl methacrylate
*3 BA: butyl acrylate

TABLE 3

|  | gel fraction (%) | 20° C. | | 85° C. |
|---|---|---|---|---|
|  |  | tensile strength (kg/cm$^2$) | elongation (%) | tensile strength (kg/cm$^2$) |
| Example 1 | 71 | 212 | 630 | 20 |
| Example 2 | 70 | 206 | 560 | 19 |
| Example 3 | 78 | 231 | 580 | 8.9 |
| Example 4 | 76 | 210 | 620 | 6.4 |
| Example 5 | 74 | 243 | 480 | 17 |
| Example 6 | 71 | 170 | 650 | 5.8 |
| Example 7 | 80 | 245 | 580 | 53 |
| Comparative Example 1 | 0 | 134 | 810 | 0.3 |
| Comparative Example 2 | 0 | 85 | 720 | 0.1 | ing to the method of Japanese Industrial Standard K7210, Table 1, Condition 4) of 3.0 g/10 min and the density of 0.94 g/cm³ as the metal salt of organic carboxylic acid were mixed. For the mixing of the components, the three components were dry blended with a tumbler and then pelletized by melt mixing with a nonparallel biaxial extruder of 30 mm$\phi$ at 250° C. The mixture had the MFR (measured according to the method of Japanese Industrial Standard K7210, Table 1, Condition 14) of 3.2 g/10 min.

The degree of the reaction calculated from the ratio of the FTIR absorption intensities of the carbonyl group in the acid anhydride group and the carbonyl group in the ester group was 38%. Tensile strength of a sample of this resin composition prepared by molding at 250° C. was measured according to the method of Japanese Industrial Standard K7113 after conditioning the sample at 23° C. in the relative humidity of 50% for 24 hours. The tensile strength at break was 230 kg/cm² and the elongation at break was 630%.

Stability of the resin composition during the molding was evaluated by the following method. By using a film molder equipped with a 25 mm$\phi$ extruder and T dice of 200 μm width, the resin composition was processed continuously for 5 hours at the resin temperature of 255° C. and with the pulling velocity of 3 m/min to produce a film of 50 μm thickness. Nothing abnormal was found on the film thus prepared and the resin composition was shown to have the excellent molding property.

the prepared resin compositions were measured. The results are shown in Table 5. The property for the processing was evaluated by molding a film with the same method as in Example 8 and then comparing the appearance of the film immediately after the start of the molding and the appearance of the film after continuous molding for 5 hours. When no difference was found, the result is shown by the mark O and, when formation of many gels or fish-eyes was observed or when the continuous molding for 5 hours was not possible, the result is shown by the mark x.

TABLE 4

| | ethylenic copolymer (a) composition | | | | | polyhydric alcohol (b)-(1) | | | reaction promoter (c) | |
|---|---|---|---|---|---|---|---|---|---|---|
| | acid anhydride | | the third monomer | | | | | ratio of hydroxyl | | |
| | compound | amount (wt. %) | compound | amount (wt. %) | MFR 190° C. | compound | amount (phr*⁵) | group to acid anhydride group | compound | amount (phr) |
| Example 8 | maleic anhydride | 2.5 | — | — | 10 | TM-30E | 0.90 | 0.4 | metal salt (a) | 1 |
| Example 9 | maleic anhydride | 2.2 | MMA | 11 | 7.0 | PE-50E | 2.0 | 1.0 | metal salt (e) | 0.1 |
| Example 10 | maleic anhydride | 3.0 | MA | 15 | 5.0 | TM-30E | 1.9 | 0.7 | metal salt (a) | 5 |
| Example 11 | maleic anhydride | 1.9 | — | — | 15 | PE-45P | 1.1 | 0.6 | metal salt (c) | 5 |
| Example 12 | maleic anhydride | 2.5 | MA | 21 | 70 | PE-50E | 2.3 | 1.0 | metal salt (a) | 6 |
| Example 13 | itaconic anhydride | 2.3 | — | — | 7.0 | PE-45P | 1.2 | 0.5 | metal salt (f) | 2 |
| Example 14 | maleic anhydride | 2.6 | BA | 14 | 13 | DG-80E | 0.98 | 0.4 | metal salt (e) | 0.4 |
| Example 15 | itaconic anhydride | 2.2 | VA*⁴ | 9.0 | 4.0 | HG-40P | 1.0 | 0.6 | metal salt (a) | 10 |
| Example 16 | itaconic anhydride | 0.9 | — | — | 22 | TM-30E | 3.4 | 4.2 | metal salt (e) | 0.05 |
| Example 17 | maleic anhydride | 3.7 | MMA | 12 | 8.5 | DG-80E | 0.17 | 0.05 | metal salt (a) | 12 |
| Example 18 | maleic anhydride | 3.0 | MA | 19 | 10 | TM-30P | 1.6 | 0.5 | metal salt (d) | 5 |
| Example 19 | maleic anhydride | 2.5 | MA | 18 | 10 | TM-30P | 3.2 | 1.2 | metal salt (d) | 2 |
| Example 20 | maleic anhydride | 2.4 | MA | 8 | 8.0 | TM-30P | 2.5 | 1.0 | metal salt (d) | 8 |
| Example 21 | maleic anhydride | 2.0 | — | — | 12 | TM-30P | 1.1 | 0.5 | metal salt (d) | 5 |

*⁴VA: vinyl acetate
*⁵phr: weight part based on 100 weight parts of the component(a)

EXAMPLES 9 TO 21

Resin compositions were prepared by using the ethylenic copolymers, the polyoxyalkylene compounds and the reaction promoters shown in Table 4 by the same method as in Example 8 and the physical properties of

TABLE 5

| | degree of the reaction (%) | tensile strength (kg/cm²) | elongation (%) | molding property |
|---|---|---|---|---|
| Example 8 | 38 | 230 | 630 | O |
| Example 9 | 36 | 250 | 610 | O |
| Example 10 | 40 | 240 | 590 | O |
| Example 11 | 39 | 200 | 640 | O |
| Example 12 | 34 | 210 | 690 | O |
| Example 13 | 36 | 210 | 660 | O |
| Example 14 | 29 | 240 | 640 | O |
| Example 15 | 33 | 260 | 620 | O |
| Example 16 | 46 | 200 | 650 | O |
| Example 17 | 18 | 220 | 710 | O |
| Example 18 | 36 | 200 | 680 | O |
| Example 19 | 32 | 190 | 640 | O |
| Example 20 | 28 | 180 | 680 | O |
| Example 21 | 34 | 180 | 690 | O |

Examples 22 to 31 shown in the following are the examples in which the compound (b)-(2) was used as the component (b).

EXAMPLE 22

By using an apparatus for production of high pressure polyethylene having a vessel type reactor, a copolymer of ethylene and maleic anhydride containing 2.5 weight % of the unit derived from maleic anhydride and having MFR (measured according to the method of Japanese Industrial Standard K7210, Table 1, Condition 4) of 10 g/10 min was prepared. The composition of the copolymer was determined by the infrared absorption spectrum. The tensile strength at break measured according to the method of Japanese Industrial Standard K6760 was 132 kg/cm$^2$ and the elongation at break was 840%.

To 100 weight parts of the copolymer prepared above, 5.5 weight parts (hydroxyl group/acid anhydride group=1.2) of glycerine monostearate as the crosslinking agent and 1 weight part (metal atom/acid anhydride group=0.06) of a partially neutralized product of ethylene-methacrylic acid copolymer [the metal salt (a)] having the MFR (measured according to the method of Japanese Industrial Standard K7210, Table 1, Condition 14) of 3.0 g/10 min and the density of 0.94 g/cm$^3$ as the metal salt of organic carboxylic acid were mixed. For the mixing of the components, the three components were dry blended with a tumbler and then pelletized by melt mixing with a non-parallel biaxial extruder of 30 mm$\phi$ at 250° C. The mixture had the MFR (measured according to the method of Japanese Industrial Standard K7210, Table 1, Condition 14) of 4.4 g/10 min.

The degree of the reaction calculated from the ratio of the FTIR absorption intensities of the carbonyl group in the acid anhydride group and the carbonyl group in the ester group was 39%. Tensile strength of of this resin composition was measured. The measurement was conducted by the same method as in Example 8. According to the method of Japanese Industrial Standard K7113, a sample prepared by molding at 250° C. was conditioned at 23° C. in the relative humidity of 50% for 24 hours and the tensile strength was measured. The tensile strength at break was 220 kg/cm$^2$ and the elongation at break was 710%.

The stability of the resin composition during the molding was evaluated by the same operation as in Example 8. By using a film molder equipped with a 25 mm$\phi$ extruder and T dice of 200 $\mu$m width, the resin composition was processed continuously for 5 hours at the resin temperature of 255° C. and with the pulling velocity of 3 m/min to produce a film of 50 $\mu$m thickness. Nothing abnormal was found on the film thus prepared and the resin composition was shown to have the excellent molding property.

EXAMPLES 23 TO 31

Resin compositions were prepared by using the ethylenic copolymers, the polyglycerine ester compounds and the reaction promoters shown in Table 6 by the same method as in Example 22 and the physical properties of the prepared resin compositions were measured. The results are shown in Table 7. The property for the processing was evaluated by molding a film by the same method as in Example 22 and then comparing the appearance of the film immediately after the start of the molding and the appearance of the film after continuous molding for 5 ours. When no difference was found, the result is shown by the mark O and, when formation of many gels or fish-eyes was observed or when the continuous molding for 5 hours was not possible, the result is shown by the mark x.

TABLE 6

| | ethylenic copolymer (a) composition | | | | | polyhydric alcohol (b)-(2) | | | reaction promoter (c) | |
|---|---|---|---|---|---|---|---|---|---|---|
| | acid anhydride | | the third monomer | | | | | ratio of hydroxyl | | |
| | compound | amount (wt. %) | compound | amount (wt. %) | MFR 190° C. | compound | amount (phr) | group to acid anhydride group | compound | amount (phr) |
| Example 22 | maleic anhydride | 2.5 | — | — | 10 | GR-SM | 5.5 | 1.2 | metal salt (a) | 1 |
| Example 23 | maleic anhydride | 2.2 | MMA | 11 | 7.0 | DG-CM | 1.4 | 0.8 | metal salt (e) | 0.1 |
| Example 24 | maleic anhydride | 3.0 | MA | 15 | 5.0 | DG-LM | 1.3 | 0.5 | metal salt (d) | 5 |
| Example 25 | maleic anhydride | 1.9 | — | — | 15 | DG-ST | 1.0 | 0.3 | metal salt (c) | 5 |
| Example 26 | maleic anhydride | 2.5 | MA | 21 | 70 | HG-SM | 2.4 | 0.9 | metal salt (d) | 6 |
| Example 27 | itaconic anhydride | 2.3 | — | — | 7.0 | PG-CT | 2.8 | 0.8 | metal salt (f) | 2 |
| Example 28 | maleic anhydride | 2.6 | BA | 14 | 13 | DG-ST | 1.8 | 0.4 | metal salt (e) | 0.4 |
| Example 29 | itaconic anhydride | 2.2 | VA | 9.0 | 4.0 | GR-SM | 1.8 | 0.5 | metal salt (a) | 10 |
| Example 30 | itaconic anhydride | 0.9 | — | — | 22 | DG-LM | 3.2 | 4.1 | metal salt (e) | 0.05 |
| Example 31 | maleic anhydride | 3.7 | MMA | 12 | 8.5 | PG-CT | 0.28 | 0.05 | metal salt (a) | 12 |

TABLE 7

| | degree of the reaction (%) | tensile strength (kg/cm$^2$) | elongation (%) | molding property |
|---|---|---|---|---|
| Example 22 | 39 | 220 | 710 | O |
| Example 23 | 34 | 240 | 690 | O |
| Example 24 | 42 | 240 | 670 | O |
| Example 25 | 33 | 200 | 640 | O |
| Example 26 | 43 | 190 | 720 | O |
| Example 27 | 37 | 220 | 660 | O |
| Example 28 | 34 | 210 | 690 | O |
| Example 29 | 36 | 250 | 630 | O |
| Example 30 | 44 | 200 | 660 | O |
| Example 31 | 17 | 210 | 730 | O |

Examples 32 to 40 shown in the following are the examples in which the compound (b)-(3) was used as the component (b).

EXAMPLE 32

By using an apparatus for production of high pressure polyethylene having a vessel type reactor, a copolymer of ethylene and maleic anhydride containing 2.5 weight % of the unit derived from maleic anhydride and having MFR (measured according to the method of Japanese Industrial Standard K7210, Table 1, Condition 4) of 10 g/10 rain was prepared. The composition of the copolymer was determined by the infrared absorption spectrum. The tensile strength at break measured according to the method of Japanese Industrial Standard K6760 was 132 kg/cm$^2$ and the elongation at break was 840%.

To 100 weight parts of the copolymer prepared above, 1.5 weight parts (hydroxyl group/acid anhydride group=0.4) of sorbitan monostearate as the crosslinking agent and 1 weight part (metal atom/acid anhydride group=0.06) of a partially neutralized product of ethylene-methacrylic acid copolymer [the metal salt (a)] having the MFR (measured according to the method of Japanese Industrial Standard K7210, Table 1, Condition 4) of 3.0 g/10 min and the density of 0.94 g/cm$^3$ as the metal salt of organic carboxylic acid were mixed. For the mixing of the components, the three components were dry blended with a Henshel mixer and then pelletized by melt mixing with a non-parallel biaxial extruder of 30 mm$\phi$ at 250° C. The mixture had the MFR (measured according to the method of Japanese Industrial Standard K7210, Table 1, Condition 14) of 3.2 g/10 min.

The degree of the reaction calculated from the ratio of the FTIR absorption intensities of the carbonyl group in the acid anhydride group and the carbonyl group in the ester group was 21%. Tensile strength of this resin composition was measured. The measurement was conducted by the same method as in Example 8. According to the method of Japanese Industrial Standard K7113, a sample prepared by molding at 250° C. was conditioned at 23° C. in the relative humidity of 50% for 24 hours and the tensile strength was measured. The tensile strength at break was 180 kg/cm$^2$ and the elongation at break was 720%.

The stability of the resin composition during the molding was evaluated by the operation as in Example 8. By using a film molder equipped with a 25 mm$\phi$ extruder and T dice of 200 μm width, the resin composition was processed continuously for 5 hours at the resin temperature of 255° C. and with the pulling velocity of 3 m/min to produce a film of 50 μm thickness. Nothing abnormal was found on the film thus prepared and the resin composition was shown to have the excellent molding property.

EXAMPLES 33 TO 40

Resin compositions were prepared by using the ethylenic copolymers, the sorbitan derivatives and the reaction promoters shown in Table 8 by the same method as in Example 32 and the physical properties of the resin compositions prepared were measured. The results are shown in Table 9. The property for the processing was evaluated by molding a film by the same method as in Example 32 and then comparing the appearance of the film immediately after the start of the molding and the appearance of the film after continuous molding for 5 ours. When no difference was found, the result is shown by the mark O and, when formation of many gels or fish-eyes was observed or when the continuous molding for 5 hours was not possible, the result is shown by the mark x.

TABLE 8

| | ethylenic copolymer (a) composition | | | | | polyhydric alcohol (b)-(3) | | | reaction promoter (c) | |
|---|---|---|---|---|---|---|---|---|---|---|
| | acid anhydride | | the third monomer | | MFR 190° C. | compound | amount (phr) | ratio of hydroxyl group to acid anhydride group | compound | amount (phr) |
| | compound | amount (wt. %) | compound | amount (wt. %) | | | | | | |
| Example 32 | maleic anhydride | 2.5 | — | — | 10 | SMS | 1.5 | 0.4 | metal salt (a) | 1 |
| Example 33 | maleic anhydride | 2.2 | MMA | 11 | 7.0 | SML | 2.6 | 1.0 | metal salt (e) | 0.1 |
| Example 34 | maleic anhydride | 3.0 | MA | 15 | 5.0 | SDC | 3.9 | 0.7 | metal salt (d) | 5 |
| Example 35 | maleic anhydride | 1.9 | — | — | 15 | SDM | 3.4 | 0.6 | metal salt (a) | 3 |
| Example 36 | maleic anhydride | 2.5 | MA | 21 | 70 | PES | 2.2 | 1.0 | metal salt (d) | 6 |
| Example 37 | itaconic anhydride | 2.3 | — | — | 7.0 | PPS | 1.2 | 0.5 | metal salt (e) | 2 |
| Example 38 | maleic anhydride | 2.6 | BA | 14 | 13 | PESML | 1.5 | 0.4 | metal salt (e) | 0.4 |
| Example 39 | itaconic anhydride | 2.2 | VA | 9.0 | 4.0 | PPSMS | 1.9 | 0.6 | metal salt (d) | 10 |
| Example 40 | itaconic anhydride | 1.4 | MMA | 19 | 21 | SOR | 0.41 | 0.8 | metal salt (c) | 3 |

TABLE 9

| | degree of the reaction (%) | tensile strength (kg/cm$^2$) | elongation (%) | molding property |
|---|---|---|---|---|
| Example 32 | 21 | 180 | 720 | O |
| Example 33 | 32 | 200 | 690 | O |
| Example 34 | 26 | 190 | 700 | O |
| Example 35 | 24 | 180 | 730 | O |
| Example 36 | 31 | 170 | 710 | O |
| Example 37 | 25 | 180 | 720 | O |
| Example 38 | 23 | 170 | 740 | O |
| Example 39 | 27 | 190 | 680 | O |
| Example 40 | 36 | 180 | 700 | O |

INDUSTRIAL APPLICABILITY

As described in the above, the resin composition and the molded article of the invention are the thermally reversible crosslinked resin composition and the thermally reversible molded article which exhibit satisfactory physical properties under the generally adopted heat molding conditions and have excellent property for the melt molding like the generally utilized resins. Therefore, molded articles having the excellent appearance and the remarkably improved properties, such as mechanical strengths, heat resistance and the like, can be obtained. The resin composition and the molded article of the invention are also produced easily and inexpensive. Furthermore, because the resin composition and the molded article of the invention are crosslinked with the thermally reversible crosslinking, waste materials formed during the molding process, molded articles out of the specification, residual materials after the punching process and the like materials can be used again by recycling.

Thus, the resin composition and the molded article of the invention can be utilized for various applications, such as melt molding processing and the like, as the the thermally reversible crosslinked resin composition and the thermally reversible crosslinked molded article which are substantially valuable for commercial applications.

In the present invention, the thermally reversible crosslinked resin composition and molded article having remarkably excellent heat stability can be obtained by selecting a suitable kind of the component (b) according to necessity and can be used for various applications which require continuous melt molding of a long time.

We claim:
1. A resin composition comprising:
   (a) an ethylenic copolymer of a monomeric mixture containing ethylene and at least one radical polymerizable acid anhydride, said copolymer having a concentration of acid anhydride groups in a range from 0.1 to 20 weight %
   (b) a polyhydric alcohol containing at least two hydroxyl groups in the molecule, and
   (c) a reaction promoter for promoting reaction between the acid anhydride groups of the ethylenic copolymer (a) and the hydroxyl groups of the polyhydric alcohol (b), the molar ratio of units of hydroxyl groups in the polyhydric alcohol (b) to units derived from acid anhydride groups in the ethylenic copolymer (a) being in a range from 0.01 to 10 and the amount of the reaction promoter (c) being in a range from 0.001 to 20 weight parts based on 100 weight parts of the ethylenic copolymer (a).

2. A resin composition as claimed in claim 1 wherein the ethylenic copolymer (a) is a binary copolymer of ethylene and the at least one radical polymerizable acid anhydride.

3. A resin composition as claimed in claim 1 wherein the ethylenic copolymer (a) is a multi-component copolymer of ethylene, the at least one radical polymerizable acid anhydride and other radical polymerizable comohomers and the concentration of the other radical polymerizable comonomers is 40 weight % or less of the total amount of the ethylenic copolymer (a).

4. A resin composition as claimed in claim 1 wherein the polyhydric alcohol (b) is a polyoxyalkylene compound having the structure obtained by adding ethylene oxide or propylene oxide to a polymethylol having the formula (I):

wherein $R^1$ is a hydrogen atom or an acyclic alkyl group, a cyclic alkyl group or an aralkyl group respectively having 1 to 12 carbon atoms, a is an integer of 0 to 2, b is an integer of 2 to 4 and a and b satisfies the relation: $a+b=4$; or to a polyglycerine having the formula (II):

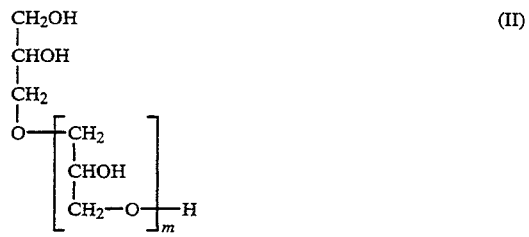

wherein m is an integer of 0 to 10.

5. A resin composition as claimed in claim 1 wherein the polyhydric alcohol (b) is a polyglycerine ester compound having the structure obtained by condensation with dehydration of an organic carboxylic acid having the formula (III):

$$R_2\text{---COOH} \qquad (III)$$

wherein $R^2$ is an acyclic alkyl group, a cyclic alkyl group, an aralkyl group or an alkenyl group respectively having 2 to 25 carbon atoms and a polyglycerine having the formula (IV):

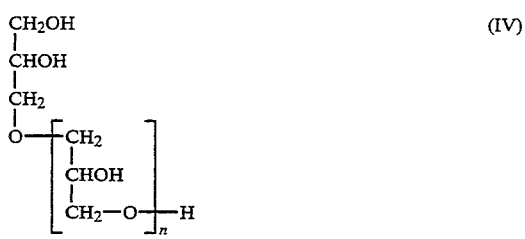

wherein n is an integer of 0 to 20, and having two or more hydroxyl groups in the molecule.

6. A resin composition as claimed in claim 1 wherein the polyhydric alcohol (b) is sorbitan or a sorbitan derivative having two or more hydroxyl groups in the molecule.

7. A resin composition as claimed in claim 6 wherein the sorbitan derivative is at least one compound selected from the group consisting of: sorbitan ester compounds having the structure obtained by condensation with dehydration of sorbitan and an organic carboxylic acid having the formula (V) and having two or more hydroxyl groups in the molecule:

$$R^3\text{---COOH} \qquad (V)$$

wherein $R^3$ is an acyclic alkyl group, a cyclic alkyl group, an aralkyl group or an alkenyl group respectively having 1 to 12 carbon atoms; polyoxyalkylenesorbitan compounds having the structure obtained by addition of ethylene oxide or propylene oxide to sorbitan or to the sorbitan ester compound described above and having two or more hydroxyl groups in the molecule; and polyoxyalkylenesorbitan ester compounds having the structure obtained by condensation with dehydration of the organic carboxylic acid having the formula (V) and the polyoxyalkylenesorbitan compound described above and having two or more hydroxyl groups in the molecule.

8. A resin composition as claimed in claim 1 wherein the reaction promoter (c) is a metal salt of a polymer containing carboxyl groups or a metal salt of an organic carboxylic acid.

9. A thermally reversible crosslinked molded article prepared by melt molding of the resin composition of claim 1, a crosslinked structure being formed during the process of cooling.

10. A resin composition as claimed in claim 1 wherein the resin composition further comprises a polyolefinic resin.

11. A thermally reversible crosslinked molded article as claimed in claim 9 wherein the article further comprises a polyolefinic resin.

* * * * *